A. PERLICH.
JAR, POT, OR VESSEL FOR CONTAINING OR KEEPING PERISHABLE PRODUCTS.
APPLICATION FILED JUNE 7, 1907.
902,166.
Patented Oct. 27, 1908.
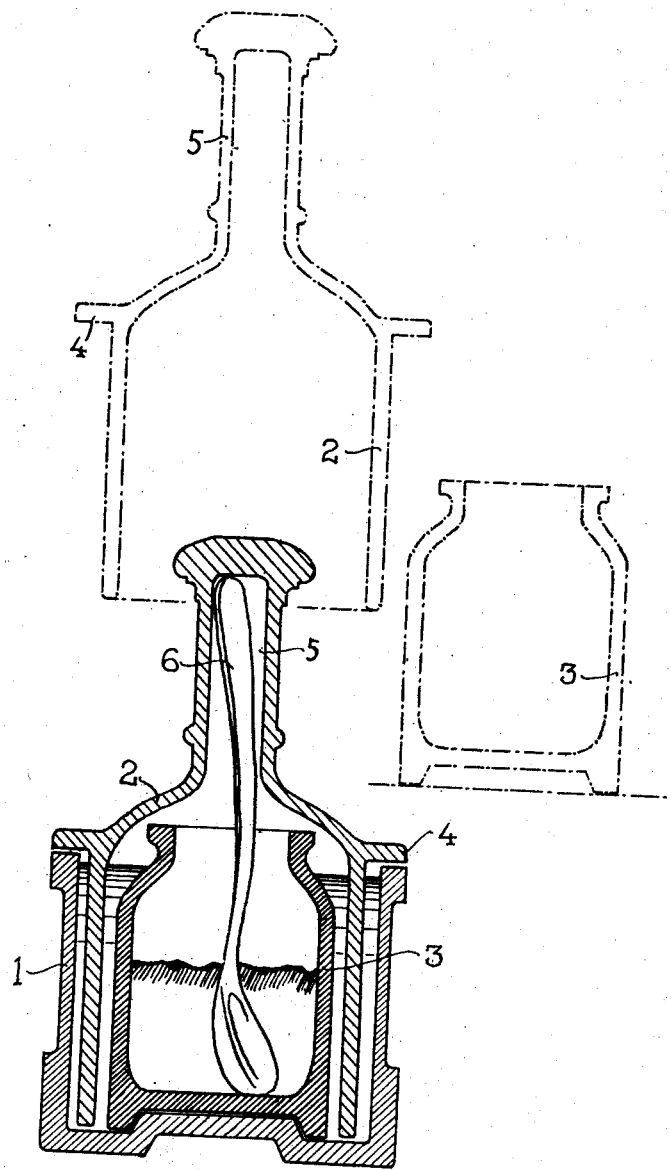

UNITED STATES PATENT OFFICE.

ALBIN PERLICH, OF LAUBEGAST, NEAR DRESDEN, GERMANY.

JAR, POT, OR VESSEL FOR CONTAINING OR KEEPING PERISHABLE PRODUCTS.

No. 902,166.          Specification of Letters Patent.          Patented Oct. 27, 1908.

Application filed June 7, 1907. Serial No. 377,708.

*To all whom it may concern:*

Be it known that I, ALBIN PERLICH, a subject of the German Emperor, residing at Laubegast, near Dresden, in the Kingdom of Saxony, Germany, have invented certain new and useful Improvements in Jars, Pots, or Vessels for Containing or Keeping Perishable Products, of which the following is a specification.

This invention has reference to improvements in jars, pots, vessels or containers destined for the reception of edibles, spice, condiments or other like or similar products which spoil or perish when exposed to the action of the air.

The contrivance consists of three vessels, two of which have their openings directed upwards and the third one with its opening directed downwards, and arranged for its sides to fit in between the walls of two first mentioned vessels. The effect of this arrangement is that the container can be closed air-tight on the principle of a syphon or so called water-seal when water or other suitable fluid is poured in between the three vessels.

The accompanying drawing shows this invention in section. The outer vessel (1) is so formed, that the inner one (3) containing the produce to be kept can be placed inside it, and in such manner that a space is left between the walls of the inner vessel (3) and those of the outer one (1). The third vessel (2), which is bell-shaped and provided with an elongated handle (5) at the upper end, is tilted or inverted over the inner vessel (3) in such manner that the walls of the vessel (2) are inserted between the walls of vessels (1) and (3). The handle of vessel (2) is made hollow, to allow of a spoon or other utensil required to take out any of the material being left in the inner vessel (3). The bell-shaped vessel (2) is also provided with a ring-shaped flange or collar (4) which serves to retain the vessel (2) in position, and also to prevent dust falling into the space between the three vessels. By filling with water or other suitable fluid the space formed between the inner vessel (3) and the outer one (1) and which is divided by the walls of the bell-shaped vessel (2), the inner vessel (3) and the material contained therein are completely isolated and protected against the influence of the atmosphere. In order to insure the concentric position of the inner vessel, so as not to interfere with the inserting of the bell-shaped cover, the bottom of the two vessels may be correspondingly depressed and raised respectively, as clearly shown in the drawing.

The container is particularly designed to keep perishable spices e. g. mustard, and the like in. When used as a mustard pot, vessel (3) is filled with mustard (or the ordinary, purchasable pot with its cover removed may serve as vessel 3), the mustard spoon (6) put in and both placed in vessel (1). Thereupon the space between both vessels is filled with water and vessel (2) put in position. As may be seen from the accompanying drawing, the handle of the spoon (6) rests in the hollow handle (5).

When it is required to take out any of the contents of (3), it is only necessary to lift out the bell-shaped vessel (2). However, when the mustard etc. contained in the pot or vessel (3) is required at table or elsewhere the whole may be conveniently taken out of vessel (1), and replaced when no longer required for immediate use.

It is quite clear that by this invention a cleanly, simple and secure method of protecting mustard and the like from the influence of the atmosphere is provided such as has not existed hitherto. The contrivance may also be used for containing fluid gum-arabic or mucilage and the like, and in such cases the hollow handle (5) of the vessel (2) forms a convenient receptacle for the handle of the brush required for application.

What I claim is:

A receptacle of the character described, comprising an outer vessel having the central portion of its bottom projected inwardly, an inner vessel of smaller diameter than the outer vessel and having the central portion of its bottom hollowed out to fit over the projection of the bottom of said outer vessel, thereby centering the inner vessel in the outer vessel and leaving an annular space between the sides of the two vessels to receive a liquid to form a water seal, and a third vessel having an open bottom and inverted between the two vessels in said water seal, said third vessel being provided with an outer peripheral flange to rest upon the rim of the outer vessel, a bell shaped top, and a long hollow stem projecting upwardly from said cover, substantially as set forth.

In testimony whereof I affix my signature in presence of two witnesses.

ALBIN PERLICH.

Witnesses:
 PAUL ARRAS,
 ULYSSES J. BYWATER.